(12) United States Patent
Meketa et al.

(10) Patent No.: US 8,689,276 B2
(45) Date of Patent: Apr. 1, 2014

(54) SYSTEM AND METHOD FOR CONTROLLING ACCESS TO FILES

(75) Inventors: Deneb Meketa, San Francisco, CA (US); Jonathan Gay, Mill Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2849 days.

(21) Appl. No.: 11/213,184

(22) Filed: Aug. 25, 2005

(65) Prior Publication Data

US 2013/0166595 A1  Jun. 27, 2013

Related U.S. Application Data

(60) Provisional application No. 60/604,849, filed on Aug. 25, 2004.

(51) Int. Cl.
*G06F 17/00* (2006.01)
*H04L 29/06* (2006.01)

(52) U.S. Cl.
CPC ........... *H04L 63/0815* (2013.01); *H04L 63/102* (2013.01)

USPC ............................................................. 726/1

(58) Field of Classification Search
CPC .......................... H04L 63/0815; H04L 63/102
USPC ............................................................. 726/1
See application file for complete search history.

(56) References Cited

U.S. PATENT DOCUMENTS

| | | | |
|---|---|---|---|
| 6,339,423 B1 * | 1/2002 | Sampson et al. | 715/854 |
| 6,772,350 B1 * | 8/2004 | Belani et al. | 707/9 |
| 6,851,060 B1 * | 2/2005 | Shrader | 707/9 |
| 7,444,666 B2 * | 10/2008 | Edwards et al. | 726/1 |
| 2002/0091798 A1 * | 7/2002 | Joshi et al. | 709/219 |
| 2003/0093666 A1 * | 5/2003 | Millen et al. | 713/157 |
| 2003/0149781 A1 * | 8/2003 | Yared et al. | 709/229 |
| 2004/0002878 A1 * | 1/2004 | Hinton | 705/7 |
| 2004/0003293 A1 * | 1/2004 | Viets et al. | 713/201 |
| 2004/0210536 A1 * | 10/2004 | Gudelj et al. | 705/64 |

* cited by examiner

*Primary Examiner* — Cheyne D Ly
(74) *Attorney, Agent, or Firm* — Wolfe-SBMC (57) ABSTRACT

A system and method provides a service, such as complete access to a file or a socket request, in response to a file describing permissions for individual or multiple domains.

38 Claims, 4 Drawing Sheets

SYSTEM AND METHOD FOR CONTROLLING ACCESS TO FILES

CROSS REFERENCE TO RELATED APPLICATIONS

This application claims the benefit of U.S. Provisional Patent Application Ser. No. 60/604,849 entitled, "Method and Apparatus for Controlling Access to Files", filed on Aug. 25, 2004, by Deneb Meketa and Jonathan Gay, having the same assignee as the present application, and is hereby incorporated by reference in its entirety.

FIELD OF THE INVENTION

The present invention is related to computer software and more specifically to computer software for requesting services over the Internet.

BACKGROUND OF THE INVENTION

Security standards for providing services, such as files or socket connections, over the Internet have evolved to include a prohibition on cross domain access. Cross domain access to a service occurs when a program or other entity downloaded from one domain attempts to access a service on another domain. For example, using the security standards of the Internet, a program downloaded from one domain may be prevented from requesting a file from another domain. Such prohibitions can ensure that a party providing the file can control how it is used by other programs, and can help maintain the security of the system on which the program runs.

The party providing the file, socket connection, or other service may, however, wish to provide access to the service to programs from other domains. For example, the party providing the service may operate two domains, and it can be advantageous to allow one domain to supply services to the other domain when both domains are operated by the same party. Additionally, a party may wish to provide access to services to certain domains not operated by that party, but nevertheless trusted by that party. Some parties may not be concerned about controlling access to services, and may wish to allow such access to services provided on one domain to any other domain.

Some parties may wish to provide access to services provided by their domain to certain other domains or all other domains, but in a limited fashion. For example, a party may wish to allow programs provided from other domains that were provided under the HTTPS protocol to access an HTTPS file, but not allow programs provided under the HTTP protocol from those same domains to access an HTTPS file. A party may wish to provide access to files to programs downloaded from certain domains or all domains, but limit the access only to certain subdirectories of the providing party's domain. A party may wish to allow access to socket connections from programs provided by another domain or all domains, as long as the socket connection requests are limited to certain port numbers or a range of port numbers.

It may be desirable to provide maximum flexibility to the party providing the service to permit the service to be provided to a program from a different domain from the party providing the service, but not allow the party providing the service to grant access in all ways. For example, a party may wish to fulfill socket connection requests from programs downloaded from certain domains or all domains, but it may be desirable to limit certain requests for such service for security reasons, even if the party has otherwise granted that request. For example, a party that makes the decision to grant access to socket connections for ports equal to or above 1024 may not otherwise have control of the lower-numbered ports, and so it may be desirable to restrict such parties from granting access to all ports in a domain.

It may be desirable to require that the program requesting the service or services for which permission is being granted specify the location from which such permission can be granted, while allowing certain default locations for permissions to be specified for programs that do not otherwise specify how to access such permission. It may be desirable to enforce such permissions on the client computer system rather than the computer system from which the service is provided. The client computer system may be in the best position to enforce such permissions, and it eliminates compatibility issues that could occur if competing permission enforcement mechanisms were used on each computer system providing the service.

It would be possible to enforce permissions via a server under control of the entity operating the client computer systems, whereby those servers contacted the servers at the domain from which the service was requested, received a description of permitted services and then enforced the permissions at the server under control of the entity operating the client computer systems, but such a method could take additional bandwidth and slow the access to the services and would require access to such a server, to which the client may not have access.

What is needed is a system and method that can allow a party operating a domain to control whether services can be provided from the domain to programs or other items downloaded from other domains, to control the manner in which services are provided to programs or other items downloaded from other domains, optionally on a per domain basis, either using a program specified location or a default location from which the permission may be specified, while limiting availability of services in some cases even if the operator of the domain allows the provision of the services, and can enforce such control via the client computer system on which the program or other item requesting such services operates.

SUMMARY OF INVENTION

A system and method provides cross domain services according to permissions set forth in one or more cross domain files stored on the domain from which the service is provided. A cross domain file specifies permissions for one or more domains, such as Internet domains, and programs that have been downloaded from any such domains may access files stored in the same, or a descendant subdirectory of the subdirectory containing the cross domain file. The program may use a specific cross domain file in a certain location, or elect to rely on a default cross domain file. A cross domain file that grants access to a secure file may require that the program making the request be provided to the requesting client device from the other domain using a secure protocol, or can allow the program to have been provided using either a nonsecure or secure protocol. A cross domain file allowing access to a socket connection request or other communication service initiated from a domain other than the domain that will service the request can specify certain ports to which one or more other domain or domains will be provided access. However, the cross domain file specifying the access may be required to be provided from a port below 1024 if access to a port below 1024 is to be granted. The system and method interprets the permissions on the client computer system and grants or denies access to the requested service, or grants limited access to the requested service from the client computer from which the service is requested.

BRIEF DESCRIPTION OF THE DRAWINGS

FIG. 3, consisting of FIGS. 3A and 3B, is a method for granting access to one or more services according to one embodiment of the present invention.

DETAILED DESCRIPTION OF A PREFERRED EMBODIMENT

Figure 1:
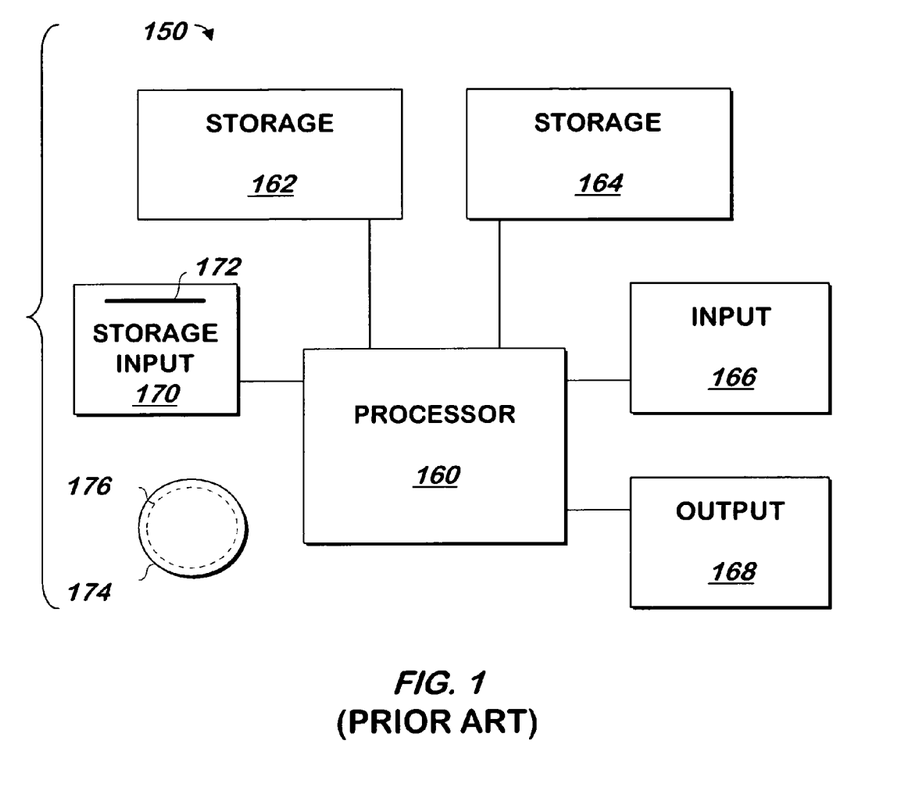
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
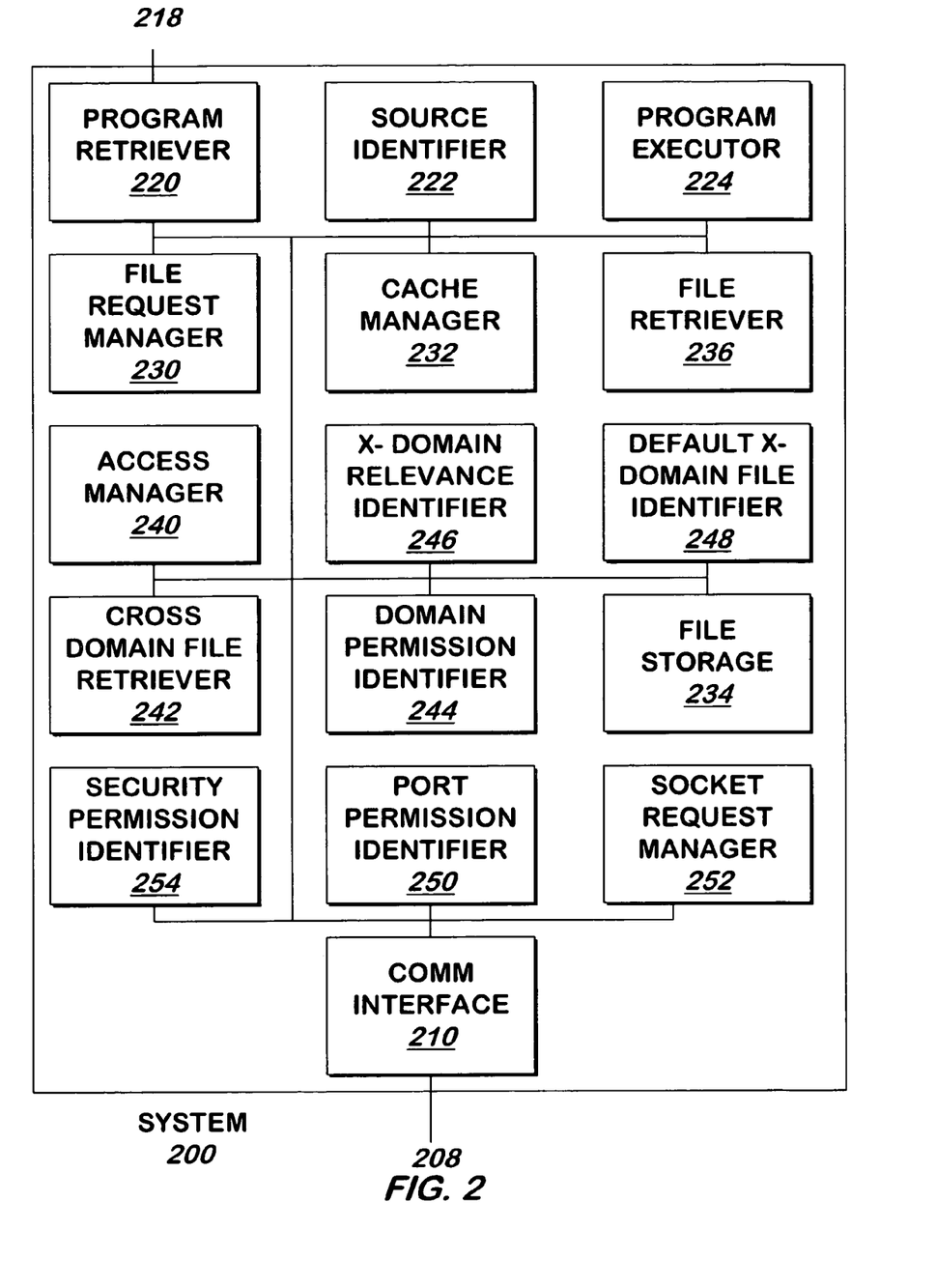
FIG. 2 is a block schematic diagram of a system for granting access to one or more services according to one embodiment of the present invention.

In one embodiment, all communication into or out of system 200 is made via input/output 208 of communication interface 210 which is coupled to a network such as the Internet or a local area network or both. Communication interface 210 is a conventional communication interface that supports Ethernet, TCP/IP and/or other conventional communication protocols. Communications with domains described herein may be made over the Internet or another network via communication interface 210.

The system and method is described herein as controlling access to files and socket connections, however the system and method can be used to grant or deny access to any service, including any type of communication service, such as any socket service. The system and method is described herein as controlling access to services requested by a downloaded program, however, the requesting entity can be any other type of item, such as a file, for example, an HTML file.

The system and method described herein uses the domain from which the program was downloaded as an attribute to authenticate the program or other file. However, any attribute, such as any secure attribute, may be used, and such attribute may be part of the program or other file itself.

A Program is Requested.

Program retriever 220 receives a request for a program file from a user or other entity via communication interface 210. In one embodiment, the program file contains a conventional Flash movie file, in the .swf format and containing images, which may be in the form of animations, instructions or both, although the present invention applies to any conventional program file containing one or more instructions, statements or requests for services. In one embodiment, the request for the program is in the form of a URL, although any other conventional request format may be employed. When program retriever 220 receives the program request, program retriever 220 checks to see if the program is in file storage 234. File storage 234 includes disk or memory storage or both and may include a conventional database and can operate as a file cache. The information in file storage 234 is arranged such that each file is associated with the URL specifying the location from which that file was originally retrieved. As described herein, file caches may be used, although in another embodiment, any of the file caches described herein may not be used and the files described herein as potentially accessible via a cache are not so accessible and a request for them is provided over the network without checking a cache.

To check to see if the program is in file storage 234, program retriever 220 provides the requested URL to cache manager 232. When cache manager 232 receives the requested URL, cache manager 232 searches file storage 234, via the operating system, for the file corresponding to the URL provided. The search may be performed using conventional search techniques such as sorting the records (if they are not already sorted) and performing a conventional binary search.

If cache manager 232 finds a match between a URL stored in file storage 234 and the provided URL, cache manager 232 requests a handle from the operating system for the file in file storage 234 associated with the URL in file storage 234 which matches the provided URL. The operating system provides cache manager 232 with the requested handle and cache manager 232 returns the handle to the entity from which the URL was provided. In this instance, the entity from which the URL was provided is program retriever 220.

If cache manager 232 searches file storage 234 for a matching URL as described above and does not find a match, cache manager 232 returns to the entity from which the URL was received a message indicating that the provided URL is not in file storage 234. In this case, cache manager 232 would return to program retriever 220 such a message.

Program retriever 220 receives from cache manager 232 either the handle to the program file in file storage 234 associated with the URL matching the URL of the program requested, or a message indicating that the file is not in file storage 234. If program retriever 220 receives from cache manager 232 the handle to the file in file storage 234 as described above, program retriever provides the handle to program executor 224 and program executor 224 executes the program as described below.

Retrieving the Program File

If program retriever 220 receives from cache manager 232 a message indicating that the URL is not in file storage 234, program retriever 220 causes the program file to be retrieved from the source of the file as described below.

To cause the program file to be retrieved from its source, program retriever 220 provides file retriever 236 with the URL of the program requested by the user. When file retriever 236 receives the URL of the program requested from program retriever 220, file retriever 236 retrieves and stores the file as will now be described. Using communication interface 210, file retriever 236 requests the file from the source of the file by building and providing a request for the file using the URL. File retriever 236 receives the file in response to the request and stores the file in file storage 234 via the operating system in a record where the file, and the URL specifying the location from which the file was received, is associated with the file. As a result of storing the file, file retriever 236 receives a handle for the file from the operating system, and file retriever 236 returns the handle to the entity that provided the URL. In this instance, the entity that provided the URL is program retriever 220.

When program retriever 220 receives the handle to the file from file retriever 236, program retriever 220 sends the handle to program executor 224 for execution of the program as described below.

Once program executor 224 receives the handle to the requested program from program retriever 220, program executor 224 begins executing the program by reading each line of the program and executing each command using conventional methods. Program executor 224 may be the conventional Flash Player product commercially available from MACROMEDIA, INC., of San Francisco, Calif., and the program file may be an executable application such as a Flash movie in the ".swf" format described at the website of Macromedia.com.

As program executor 224 executes the program, a file or a socket connection may be requested based on the instructions in the program, and each type of request may be made as many times as desired by the program. If the program requests a file via program executor 224, program executor 224 provides a file request to file request manager 230. If the program requests a socket connection via program executor 224, program executor 224 provides a socket connection request, which may include an IP address and a port number, to socket request manager 252. The handling of the file request will now be described, and the handling of the socket request will be described in detail further below.

The Program Requests a File by Providing a URL

The file request may include the URL of the file being requested and the URL of the program requesting the file. When program executor 224 receives the request for the file from the program, it adds the URL of the program itself to the URL of the file to build the request. In one embodiment, program executor 224 receives the URL of the program from program retriever 220 when program retriever 220 provides the handle of the file to program executor 224. In another embodiment, program executor 224 requests from the operating system (not shown) the URL of the program using the handle of the program.

If file request manager 230 receives a file request from program executor 224, file request manager 230 requests cache manager 232 to check file storage 234 for the requested file by providing cache manager 232 with the URL of the requested file. Cache manager 232 searches file storage 234 for the provided URL in the same manner as described above. In this instance, the entity from which the URL was received is file request manager 230.

If file request manager 230 receives from cache manager 232 the handle of the file in file storage corresponding to the URL provided, in one embodiment file request manager 230 provides the handle to program executor 224 although in another embodiment file request manager 230 first checks with access manager 240 that the program has the permission to access the file as described below, and only provides the handle to the requested file if the program has such permission. Once it receives the handle, program executor 224 accesses the file in file storage 234 via the operating system, reads the file and follows the commands and continues executing the program as described below.

If file request manager 230 receives from cache manager 232 a message indicating that the URL is not in file storage 234, file request manager 230 then causes a determination to be made of whether the program has permission to access the file. To obtain the determination of whether the program has permission to access the requested file, file request manager 230 provides a file access request to access manager 240. In one embodiment, the file access request may include the URL of the file being requested and the URL of the program requesting the file.

Determine if the Program and Requested File have Different Domains; Providing the Requested File if the Domains are the Same.

When access manager 240 receives the file access request from file request manager 230, access manager 240 determines if the program has permission to access the file. To do so, access manager 240 has the URL of the requested file parsed to determine the protocol, domain and path of the file, determines if the requested file is from the same domain as the program requesting the file, finds the cross domain file relevant to the requested file and the program requesting the file if their source domains are not the same, and determines security permissions as will now be described.

To determine the source of the file being requested, access manager 240 sends the URL of the requested file to source identifier 222. When source identifier 222 receives the URL, source identifier 222 parses the URL into various components and builds the components into a source record. The components may include the protocol, the domain, in the form of either a domain name or an IP address, and the path and filename of the file.

When it receives a URL, source identifier 222 parses the URL provided by reading the URL from left to right using conventional parsing techniques. For example, in one embodiment, all characters beginning from the first character on the left of the URL to the three grouped characters, "://" or the colon character ":", constitutes the protocol. All characters between the three grouped characters, "://" or the colon character ":", and the first "/" to the right of the three grouped characters, "://", constitutes the domain, and all characters after the first "/" that follows the three grouped characters, "://", constitutes the path and filename of the file. Source identifier 222 builds the three components from the URL it receives into a source record and returns the source record to the entity from which the URL was received. In this case, said entity is access manager 240.

When access manager 240 receives from source identifier 222 the source record for the URL of the file being requested, in one embodiment, access manager 240 then checks to see if the domain of the requested file is the same as the domain of the program requesting the file, although in another embodiment, access manager 240 proceeds as described below for the case in which such domains are not the same, even if they are. Access manager 240 does this by comparing the domain of the requested file received from source identifier 222 in the source record with the domain of the program requesting the file. To obtain the domain of the program, access manager 240 provides the URL of the program to source identifier 222 which parses the URL and returns the source record for the program to access manager 240 as described above. Access manager 240 compares the domain of the requested file and the domain of the program requesting the file using conventional text comparison methods. If access manager 240 determines that the domains match, access manager 240 signals file request manager 230 that permission is granted to access the requested file. File request manager 230 then signals file retriever 236 to retrieve and/or provide the file and file retriever 236 retrieves the requested file in the same manner as described above for the program file, and provides the handle to the file to the entity that requested it. In this instance, the entity from which file retriever 236 received the URL was file request manager 230. When file request manager 230 receives the handle to the requested file in file storage 234, file request manager 230 provides the handle to program executor 224. Program executor 224 accesses the file, provides it to the program as requested by the program, and continues executing the program as described below. Any subsequent accesses of that file are provided by program executor 224 until the program requests the file to be closed in one embodiment, until the program terminates in another embodiment, until program executor 224 terminates in another embodiment, until file request manager 230 terminates in another embodiment, until the occurrence of another event in another embodiment, or until any one of some or all of these occur in another embodiment.

If access manager 240 determines that the domains of the requested file and the program requesting the file do not match, access manager 240 then determines if access to the requested file is permitted for the program. To do so, access manager 240 utilizes one or more cross domain files, which will now be described.

A domain may be in the form of a domain name or an IP address. As described herein, a comparison of two domain names may be made by first performing a DNS lookup to identify ah IP address from a domain name, or a reverse DNS lookup to identify a domain name from an IP address on either domain.

Overview of Cross Domain Files.

A cross domain file is a file which may be written using a format, such as XML, that is provided via, or by, the same domain as the requested file, socket response, or other service, and which specifies at least one domain that is not the same as the domain on which the cross domain file resides. For the specified domain, permission is granted to files or programs originating on that specified domain to access files located in the directory in which the cross domain file resides, or a subdirectory thereof or to make socket requests as described in more detail below. In one embodiment, specified domains are contained in the cross domain file as a value of an XML tag. Each such XML tag may appear as a beginning tag and an ending tag with at least one value denoting a permitted domain listed in between the beginning and ending tag. In one embodiment, the XML coding in the file may appear as follows:

<cross-domain-policy>
<allow-access-from domain="x"/>
</cross-domain-policy> where "x" denotes either a domain name or an IP address as described in further detail below, with wildcards being permitted. In one embodiment, there may be multiple allow-access-from domain tags in each cross domain file, each granting access to different domains, between the beginning and ending cross-domain-policy tags. In one embodiment, in order for a cross domain file to grant a program access to a file stored in a different domain from the domain in which the program originated as described above, the manner of specifying the domain (e.g. a domain name or an IP address) of the program requesting access should be consistent with the domain specified by the cross domain file for the specified domain as described in more detail below.

In one embodiment, "x" may consist of the name of the domain, "www.domain.com", or a specific IP address such as "11.111.11.111", and in order to be consistent, the form of the domain specified as the source of the program requesting access should match the form in the cross domain file exactly. In such embodiment, if the source of the program requesting the file were specified, for example, as solely "www.domain.com", but the cross domain file granted permission to the IP address corresponding to www.domain.com, no match would occur and permission to access the file would not be granted. In another embodiment, a match would occur in this case via domain name lookups based on the IP address or reverse domain name lookups based on the domain name.

In one embodiment, wild cards may be used in the specification of the domain name. For example, "x" may consist of the text, "*.domain.com" which may denote that any text prior to the "." before "domain" would be considered a match. For example, in such an embodiment, "one.domain.com", "domain.com", and "blue.domain.com" would all be considered to match "*.domain.com" and permission to access a file would be granted as described in more detail below to programs from any of those domains, however, a program from "www.domain.car.com" would not be granted permission to access any file based on such an allow-access-from value.

Obtaining the Cross Domain List.

As described in more detail below, each cross domain file specified by the program that is relevant to the requested file will be checked to determine if permission to access the requested file is granted to the program by any file specified. There may be one cross domain file specified by the program, or more than one cross domain file specified by the program. A cross domain file is "relevant" to a request for a file if the cross domain file is located in the same directory as the requested file or is located in a directory from which the directory containing the requested file descends. If no specified cross domain file is relevant, or if no specified relevant cross domain file grants permission to the program to access the file or if no cross domain file is specified, the system and method attempts to determine whether any relevant default cross domain file grants the program access to the requested file, as described in more detail below.

Although a program need not specify any cross domain file, a program may specify one or more cross domain files. There are a number of ways the program may specify one or more cross domain files. In one embodiment, the program specifies one or more cross domain files (other than default cross domain files) to be used to determine whether the program has permission to access the requested file in the same instruction used to request the file.

In another embodiment, the program may designate zero or more cross domain files using any number of instructions separate from the instruction used to request the file. In still another embodiment, the program may use both of the above two techniques.

If the program specifies one or more cross domain files with the request for the file, in one embodiment, the program provides program executor 224 with the identifiers (such as the URL) of the one or more cross domain files. Program executor 224 then provides file request manager 230 with the identifier of the one or more cross domain files when program executor 224 provides file request manager 230 with the file request as described above. When file request manager 230 receives the identifier of the one or more cross domain files from program executor 224, file request manager 230 builds the identifier of the one or more cross domain files into a cross domain file list which file request manager 230 provides to access manager 240 with the file request when causing access manager 240 to determine whether permission to access the requested file is granted.

If the program specifies one or more cross domain files using instructions separate from the file request, in one embodiment, the program specifies to program executor 224 identifiers of each one or more cross domain file through the execution of a line of instruction that provides them. When program executor 224 executes such a line of instruction, program executor 224 provides each of the identifiers of the one or more cross domain file identifiers to access manager 240. When access manager 240 receives each one or more cross domain file identifiers, access manager 240 adds them to a cross domain file list it maintains, the list containing the cross domain file identifiers received from program executor 224.

If both techniques are used, when access manager 240 receives the one or more identifiers of the cross domain files from file request manager 230 with the file request, access manager 240 adds the identifiers of the cross domain files on the cross domain file list provided by file request manager 230 to the cross domain file list that access manager 240 has already created from the identifiers of the cross domain files provided to it by program executor 224 as described above. In another embodiment, only a single cross domain file is placed into the "list", such file being the last cross domain file specified.

The cross domain file list built by either file request manager 230 or access manager 240 may be in the form of a list of URLs specifying the location of each cross domain file.

Once access manager 240 has a-cross domain file list as described above, access manager 240 causes a determination to be made of which cross domain files on the cross domain file list are relevant to the file request as described further below. The relevant cross domain files are then checked to determine whether any relevant cross domain file permits access to the requested file by programs downloaded from the domain of the program requesting the file as described further below. In one embodiment, if none of the one or more cross domain files provided by the program grant permission to programs downloaded from the domain of the program requesting the file, the identifiers of one or more default cross domain files are identified, retrieved, and built into a cross domain file which is also checked to determine if permission is granted as described further below.

A Cross Domain List was Provided.

When access manager 240 either receives a cross domain file list from file request manager 230 or builds a cross domain file list as described above, access manager 240 then provides it and the source record of the file being requested to cross domain relevance identifier 246 to determine which, if any, cross domain file on the at least one cross domain list is relevant. A cross domain file is relevant if it resides on the same domain as the requested file and in a directory at or above the directory in which the requested file resides.

To determine which, if any, cross domain file is relevant, cross domain relevance identifier 246 receives from access manager 240 a relevance request that includes A) the cross domain list containing at least one URL, and B) the source record of the file being requested.

Cross domain relevance identifier 246 determines the relevance of each cross domain file on the cross domain list by first parsing the cross domain file list using conventional parsing techniques in such a way as to separate out each cross domain file from the list. In one embodiment, each cross domain file on the cross domain list is represented with the URL specifying the location of the cross domain file as described above. Once cross domain file URL is isolated, cross domain relevance identifier 246 determines whether or not a cross domain file is relevant by checking first that the cross domain file resides on the same domain as the requested file, and furthermore, resides in a directory of the domain that is at or above the directory in which the requested file resides.

To determine if a cross domain file is located on the same domain as the requested file, cross domain relevance identifier 246 first has the identifier of the cross domain file parsed into a source record by providing the URL of the cross domain file to source identifier 222. Source identifier 222 receives the URL, parses the URL into the various components, builds a source record for the URL, and returns the source record to the entity from which the URL was received as described above. In this instance, the entity from which the URL was received is cross domain relevance identifier 246.

When cross domain relevance identifier 246 receives the source record of the relevant cross domain file from source identifier 222, cross domain relevance identifier 246 checks the domain of the cross domain file against the domain of the requested file which was previously provided by access manager 240. If the two domains do not match, cross domain relevance identifier 246 moves on to the next cross domain file separated from the at least one cross domain list and repeats the process of determining if the domain of the cross domain file and the domain of the requested file match as described above. In one embodiment, cross domain relevance identifier 246 converts the domain of the requested file to a domain name from an IP address or to an IP address from a domain name and attempts to match the domain of the cross domain file with the domain of the requested file using both IP address and name so that an IP address of a domain will match the name of that domain. Such conversion may be performed using conventional DNS or reverse DNS techniques. In another embodiment, no such conversion is performed.

In one embodiment, if cross domain relevance identifier 246 determines that the domain of the cross domain file and the domain of the requested file match, cross domain relevance identifier 246 continues checking for relevance by determining if each subsequent subdirectory of the location of the cross domain file and the location of the requested file correspond as described below and only marks as relevant a cross domain file having a directory that corresponds to the directory of the requested file. The directory of a cross domain file corresponds to the directory of the requested file if the directory of the cross domain file is at or above the directory in which the requested file resides.

To determine if such a correspondence exists, using the location components of the source record of the cross domain file and the source record of the requested file, both obtained as described above, cross domain relevance identifier 246 compares the path of the cross domain file with the path of the requested file to determine whether the requested file is in the same directory or a descendant directory of the cross domain file. Cross domain relevance identifier 246 first extracts the path of the cross domain file from the path and filename of the source record of the cross domain file. In one embodiment, cross domain relevance identifier 246 reads and stores internally the characters denoting the path of the cross domain file from left to right using conventional parsing techniques. Cross domain relevance identifier 246 then examines the path of the file requested, reading each character from left to right, and comparing each character and its position to the characters previously stored that denote the path of the cross domain file. If the characters stored internally by cross domain relevance identifier 246 denoting the path of the cross domain file exactly match the leftmost characters, up to at least one entire subdirectory in the path of the file requested, cross domain relevance identifier 246 marks the cross domain file as relevant on the cross domain file list. In this manner, if the requested file is located in a subdirectory of the directory containing the cross domain file, the cross domain file will still be determined to be relevant by cross domain relevance identifier 246 because the cross domain file permissions apply to all files at or below the directory in which the cross domain file is located.

Cross domain relevance identifier 246 then selects the next identifier of the cross domain file in the list and repeats the process described above. When cross domain relevance identifier 246 has determined the relevance for each of the cross domain files having identifiers in the list of cross domain files, cross domain relevance identifier 246 returns to access manager 240 the marked cross domain file list. If cross domain relevance identifier 246 does not find a relevant cross domain file, cross domain relevance identifier 246 so indicates to access manager 240.

Access manager 240 receives from cross domain relevance identifier 246 the relevance-marked cross domain file list and optionally, an indication whether any of the cross domain files identified in the list were relevant. If none of the cross domain files are relevant, in one embodiment, access manager 240 indicates to file request manager 230 that permission to access the file is not granted. File request manager 230 indicates to program executor 224 that permission to access the file is not granted, and program executor 224 indicates an error condition to the program, which may attempt to recover from the error. As described below, one or more default cross domain files may first be checked before providing such indication, and other embodiments may allow limited access to a file for which permission is not granted.

If at least one cross domain file is relevant, access manager 240 selects the first marked cross domain file identifier on the list, and provides it to cross domain file retriever 242. Cross domain file retriever 242 retrieves the cross domain file and stores it into file storage 234 and provides a handle to the relevant cross domain file to access manager 240.

Cross domain files described herein may not, in fact be retrievable as specified as described herein. If cross domain file retriever 242 is unable to retrieve the file, it signals access manager 240, which attempts to select another relevant cross domain file identifier and repeats the process described above. If another relevant cross domain file identifier does not exist, access manager 240 proceeds as described below.

When access manager 240 receives the handle to the relevant cross domain file from cross domain file retriever 242, access manager 240 provides domain permission identifier 244 with a permission request that includes the source record of the program file and the handle to the relevant cross domain file.

Domain permission identifier 244 then compares the domain of the program requesting access to the file with the domain or domains granted access by the relevant cross domain file. To determine the domain specified by the cross domain file, domain permission identifier 244 parses the cross domain file by first reading the cross domain file and locating the cross-domain-policy beginning tag of the cross domain file. In the embodiment described above, each line after the beginning tag is a separate allow-access-from tag denoting a different-domain whose programs, when downloaded to a client computer system, are permitted access to files located in, or in a directory descending from, the directory in which the cross domain files resides. Domain permission identifier 244 parses the allow-access-from tag, reading the tag from left to right using conventional parsing techniques. For example, after domain permission identifier 244 reaches the end of the string of characters, "domain=" or "domain=''", the characters from the first non space character until either a space character or the end tag character, "/" or an end quotes "'", are characterized as the domain whose programs, when downloaded to a client computer system, are permitted access to files in or below the directory in which the cross domain file resides or in directories descending from that directory.

In one embodiment, the program is permitted access if its domain matches the specified domain as described above. Domain permission identifier 244 compares the domain specified by the allow-access-from tag with the domain of the source record of the program requesting the file provided by access manager 240 using conventional text comparison methods.

If domain permission identifier 244 determines that the domain specified by the cross domain file and the domain of the program requesting access do not match, domain permission identifier 244 repeats the process for any succeeding allow-access-from tag on the relevant cross domain file. Domain permission identifier repeats this process as described above each time domain permission identifier 244 determines that an allow-access-from tag does not permit the domain of the program to access the requested file until domain permission identifier 244 locates a domain that matches the domain of the program or reaches the end of the file, denoted by "</cross-domain-policy>" in the example above. If domain permission identifier 244 does not find a domain value that permits access to the requested file by the program as described above, domain permission identifier 244 returns an error message to access manager 240 indicating that permission is not granted to access the requested file. Access manager 240 then selects the next relevant cross domain file from the list and repeats the process described above.

If domain permission identifier 244 identifies an allow-access-from tag permitting access to the requested file, domain permission identifier 244 returns to access manager 240 1) an indication that permission is granted and 2) the handle to the relevant cross domain file which provides the access.

In one embodiment, when access is granted to a file via a cross domain file, access may be denied if the program file uses a protocol of HTTP and the requested file has a protocol of HTTPS (referred to as the condition), unless a security parameter in the file is explicitly set to false. In such embodiment, when domain permission identifier 244 identifies that permission has been granted as described above, it attempts to continue reading the tag that granted such permission in search of the string of characters compromising a secure attribute, "secure=value", where "value" is "true" or "false". Domain permission identifier 244 returns the value of the secure attribute to access manager 240. If no secure attribute is specified, domain permission identifier 244 returns an attribute value of true, indicating that the security feature is enabled, which is the default in one embodiment.

To determine if the condition is true, and if so, whether access should be nevertheless granted or denied, when access manager 240 receives an indication that access to the requested file is allowed, access manager 240 provides security permission identifier 254 with the source record of the requested file, 244 the value of the secure attribute, and the source record of the program requesting access.

When security permission identifier 254 receives such information from access manager 240, security permission identifier 254 compares the protocols of the program requesting the program file and of the requested file from their respective source records and checks that the protocol of the requested file is not more secure than the protocol of the program file. In one embodiment, if the protocol of the program requesting access is HTTP and the protocol of the requested file is HTTPS, by default, permission to access the file is not granted and the program is unable to utilize the cross domain file to access the requested file unless the cross domain file explicitly specifies that security should be disabled (e.g. the secure attribute is "false"). In such case, security permission identifier 254 checks the secure attribute received from access manager 240. If the secure attribute is "true" or no secure attribute was specified, security permission identifier 254 indicates to access manager 240 that the cross domain file is not to be utilized. If the secure attribute is "false", security permission identifier 254 returns a message to access manager 240 that access to the cross domain file is to be provided.

Alternatively, if the program requesting access has a protocol of HTTPS and the requested file has a protocol of HTTP, or both protocols are the same (e.g. HTTP-HTTP, HTTPS-HTTPS, or FTP-FTP), permission is granted independent of the secure attribute and security permission identifier 254 returns to access manager 240 a message indicating that access to the cross domain file is to be provided.

If access manager 240 receives from security permission identifier 254 the indication that security permission is not granted, access manager 240 provides the handle to the cross domain file back to domain permission identifier 244, which continues to process as described above. In this manner, all relevant cross domain files may be checked until all cross domain files on the list have been checked or access to the requested file is granted as described above.

If another such relevant cross domain file does not exist on the list, or each such relevant cross domain file does not grant security permission to the program requesting the file, or if no cross domain files have been provided by the program, access manager 240 may attempt to obtain the default cross domain file and determine if security permission is granted by the default cross domain file, as described below. If no cross domain file grants security permission to the program requesting the file, access manager 240 returns an error message to file request manager 230, which provides an error message to program executor 224 indicating that access to the file is not granted.

In one embodiment, if it receives such an error message, program executor 224 does not receive access to the file as described herein and instead continues executing without the requested file or terminates the program. In another embodiment, instead of returning an error message, file request manager 230 prompts the user with a warning and requests permission to provide the requested file. If the user grants permission, file request manager 230 provides program executor 224 with the file as described herein as if access had been granted by a cross domain file as described above. In another embodiment, instead of returning an error message and not providing the file, file request manager 230 provides program executor 224 access to the file as described herein, but indicates to program executor 224 that such access is under restricted conditions. In such embodiment, program executor 224 allows certain access to the file by the program, but not under all circumstances. For example, the program may be allowed to play audio and video in the requested file, but not programmatically control the requested file or provide values to it, or the requested file may not be allowed to programmatically control the program or provide values to the program, or both.

If access manager 240 receives from security permission identifier 254 the indication that security permission is granted by the cross domain file, access manager 240 signals file request manager 230 with the message that access to the requested file is permitted.

When file request manager 230 receives the message from access manager 240 that access to the requested file is permitted, file request manager 230 causes the requested file to be retrieved by file retriever 236 as described above and provides a handle to the requested file to program executor 224. To have the requested file retrieved, file request manager 230 provides the URL of the requested file to file retriever 236. File retriever 236 retrieves the file using conventional file retrieval methods via communication interface 210 as described above and stores the retrieved file in file storage 234 as described above. File retriever 236 receives a handle for the retrieved file stored in file storage 234 from the operating system and provides the handle to file request manager 230. When file request manager 230 receives the handle to the requested file stored in file storage 234, file request manager 230 provides the handle to program executor 224 so that program executor 224 may access the file and continue executing the program. Program executor 224 receives the handle to the requested file from file request manager 230 and accesses the file in file storage 234 via the operating system. Program executor 224 continues executing the program as described below.

File is Retrieved from a Different Domain.

It is possible for a file that is requested from one domain, to be retrieved from a different domain. For example, as file retriever 236 provides the request for a URL to a server, file retriever 236 may receive an HTTP redirect command instructing it to retrieve the file from a different URL, and such URL may include a different domain.

In one embodiment, file retriever 236 will retrieve the file from the different domain as described above. However, when file request manager 230 receives the message from access manager 240 that access to the requested file is permitted, access manager 240 provides the source record of the program file and the requested file to file request manager 230. Additionally, file retriever 236 provides the URL from which the file is ultimately retrieved to file request manager 230 when it provides the handle to the file when access to the requested file is permitted as described above.

File request manager 230 provides the URL from which the file was retrieved to source identifier 222 and receives the source record of the retrieved file. File request manager 230 then compares the domain of the retrieved file from its source record with the domain of the requested file from its source record. If the domains match, file request manager 230 provides the handle to the file to program executor 224 as described above. If the domains do not match, file request manager 230 compares the domain of the retrieved file from its source record with the domain of the program file from its source record. If the domains match, file request manager 230 provides the handle to the retrieved file to program executor 224 as described above.

If the domains do not match, file request manager 230 provides a file access request to access manager 240, but this time, the file access request contains the URL of the program and the URL from which the file was retrieved. Access manager 240 processes the access request as described above, and indicates to file request manager 230 whether access to the file is permitted. If access to the file is permitted, file request manager 230 provides the handle to the file already received to program executor 224 for use as described above. If access to the file is not permitted, file request manager 230 either provides an error message or provides the handle to the file and indicates that access to the file should be limited as described herein.

In another embodiment, instead of retrieving the file from a different URL, when file retriever 236 determines it is to retrieve the file from a different URL (e.g. it receives a redirect command), file retriever 236 provides file request manager 230 with the URL from which it will make the next attempt, before attempting to retrieve the file from that new URL. File request manager 230 obtains the source record of the new URL from source identifier 222 by providing it the URL and compares its domain with the domains of the requested file and the program. If the domain from which the file is to be retrieved matches the domain of the request or the domain of the program file, file request manager 230 signals file retriever 236 to perform the retrieval, and file retriever 236 complies and, if the file is retrieved from that URL, provides the handle to the file to file request manager 230, which provides it to program executor 224. If the file is to be retrieved from yet another URL, the procedure is repeated as described above. If the domain from which the file is retrieved does not match the domain of the requested file or the program, file request manager 230 provides an access request containing the URL of the program file and the new URL, which is processed as described above.

Default Cross Domain File

In one embodiment, if no cross domain file was provided by the program or no cross domain file provided by the program was found to be relevant by cross domain relevance identifier 246, or no relevant cross domain file grants access to the requested file, before notifying program executor 224, access manager 240 attempts to locate a default cross domain file that will grant access to the requested file. If the attempt succeeds, access manager signals file request manager 230 to retrieve the requested file and provide it to program executor 224 as described above and otherwise, indicates to file request manager 230 that access to the file is not granted, and file request manager 230 proceeds as described above.

To obtain a list of one or more default cross domain files, access manager 240 provides to default cross domain file identifier 248 the source record of the requested file previously parsed as described above.

Default cross domain file identifier 248 receives the source record of the requested file and identifies a list of at least one default cross domain file, as will now be described. Default cross domain file identifier 248 determines the potential path and file name of a default cross domain file. The filename of the default cross domain file may be a standardized name of which default cross domain file identifier 248 is aware and for which default cross domain file identifier 248 provides as described herein. In one embodiment, the default cross domain file path is the root directory of the domain on which the requested file resides. In another embodiment, the default cross domain path for a given requested file is located in a path that is a subdirectory of the above-mentioned root directory but not below the path of the requested file.

In still another embodiment, default cross domain file identifier 248 identifies multiple default cross domain files, one at every subdirectory in the path between the root and the subdirectory of the requested file, inclusive of those two subdirectories. To identify the location of the requested file, default cross domain file identifier 248 parses the location of the requested file previously provided by access manager 240 in the source record of the requested file. To parse the location of the requested file, default cross domain file identifier 248 starts at the left of the given location and reads each character starting from the left and moving to the right until there are no more characters to read. In one embodiment, default cross domain file identifier 248 stores internally a list of the subdirectories above and at the relative path of the requested file. To determine the subdirectories, default cross domain file identifier 248 reads the characters as described above and when it reaches the first "/" character, characterizes all the characters from the left of the location specification to that first "/" character as the first subdirectory. The string of characters after the first "/" character and until the second "/" character are denoted as the second subdirectory. The string of characters after the second "/" character and until the third "/" character are denoted as the third subdirectory. The process continues until default cross domain file identifier 248 reaches the last "/" character. Each subdirectory is associated with its level (e.g. first, second, third) in the pathname as described above. In one embodiment, an alternate means of identifying the order of subdirectories is used.

When default cross domain file identifier 248 identifies the subdirectory in which the requested file resides, default cross domain file identifier 248 proceeds to identify one or more default cross domain files on the source domain of the requested file in which a relevant cross domain file may be located and adds each such cross domain file to a list of cross domain files it builds. In one embodiment, default cross domain file identifier 248 begins with the root directory, adds the name of the default cross domain file and adds the path and filename to the list. In one embodiment, this is the only default cross domain file and in another embodiment, default cross domain file identifier 248 may proceed through each subdirectory in the path to the requested file and add a default cross domain file at that path and with the name of the default cross domain file to the list. Default cross domain file identifier 248 moves on to the next subdirectory in the path of the requested file and repeats the process of identifying a cross domain file at this subdirectory as described above until default cross domain file identifier 248 reaches the subdirectory in which the requested file resides.

In one embodiment, the list is provided in the order built and in another embodiment, the list is built in the reverse order so that a site with more than one default cross domain file will be scanned from the subdirectory in which the requested file resides to the root directory.

Default cross domain file identifier 248 marks all the cross domain files in the list it builds as relevant provides the default cross domain file to access manager 240, which repeats the process of selecting the cross domain file identifiers on the list, and providing them to cross domain file retriever 242, processing the list as described above, until it reaches the end of the list and denies access as described above or receives an indication that access is granted as described above.

The Program Requests a Socket Connection.

The present invention may be used to grant or deny access to a socket connection requested by a program. As noted above, program executor 224 receives a request from the program to open a socket connection over the internet to a remote computer system, for example, to receive and/or provide a file or other data. When program executor 224 receives the socket connection request, program executor 224 provides a socket permission request to socket request manager 252. The socket connection request may include a domain (either a name or an IP address) and the port number on the domain for the requested socket connection, as well as the domain (either a name or an IP address) of the program requesting the file. Either IP address or domain may be obtained using conventional DNS or reverse DNS lookup techniques from the form of the domain provided, and such lookup may be performed by socket request manager 252 or by another entity coupled to socket request manager, such as program retriever 220. The socket connection request may specify two IP addresses as the identifiers of the domains described above, or either or both may be specified as a domain name, or one may be specified as a domain name and the other as an IP address, and either may be converted to the form of the other as described above or they may be left as is. As noted above, a domain specified using one form (e.g. IP address) may be considered to be different from the same domain specified using the other form (e.g. domain name) or one may be converted into the form of the other.

When socket request manager 252 receives the socket connection request from program executor 224, socket request manager 252 checks to see if the domain of the requesting program is different from the domain of the socket requested. If not, socket request manager 252 signals program executor 224 that the socket may be opened and program executor 224 opens the socket via communication interface 210 using conventional techniques. The program may then use the socket for communications using conventional techniques. If the domain of the socket is different from the domain of the requesting program, socket request manager 252 provides the socket connection request to access manager 240.

Access manager 240 receives the socket connection request and determines if there is a cross domain domain and port from which a policy file may be downloaded that can permit the requested socket connection. In determining if there is a cross domain domain and port which will permit the socket connection requested by the program, access manager 240 has either previously received zero or more cross domain domains and ports from the program in one or more instructions separate from the instruction containing the socket report via program executor 224 which access manager 240 assembles into a list of domains and ports in the same manner as was described above for the cross domain file list as described above, or receives from socket request manager 252 a cross domain domain and port list that was provided with the socket connection request in the same manner as the cross domain file list was received from file request manager 230 as described above.

In one embodiment, access manager 240 receives at least one cross domain domain and port or a cross domain domain and port list from both sources and combines the list and one or more domains and ports into one cross domain domain and port list in the same manner the identifiers of the cross domain files were combined as described above.

If access manager 240 does not receive any cross domain domains and ports from either source, access manager 240 attempts to retrieve one or more default cross domain domains and ports as described further below.

Identifying a Relevant Cross Domain Domain and Port.

If access manager 240 has a cross domain domain and port list obtained as described above, access manager 240 proceeds to determine if there is at least one relevant domain on the cross domain file list. To do so, access manager 240 provides the cross domain list and the domain of the requested socket connection to cross domain relevance identifier 246 in a relevance request, In one embodiment, a cross domain file is relevant to a socket request if the domain of the source domain of the cross domain file matches the domain of the source domain of the requested socket connection.

When cross domain relevance identifier 246 receives the relevance request from access manager 240, cross domain relevance identifier 246 determines the relevance of each of the cross domain files on the cross domain list by first parsing the cross domain list using conventional parsing techniques in such a way as to separate out each cross domain file from the list.

Cross domain relevance identifier 246 then reads each cross domain file domain on the list and compares each domain on the list to the domain of the socket requested. If cross domain relevance identifier 246 finds a cross domain file domain on the list which matches the domain of the socket requested, cross domain relevance identifier 246 determines whether the port number of the cross domain file is 1024 or above. If the port number is not 1024 or above, cross domain relevance identifier 246 marks the cross domain domain and port on the list as relevant. If the port number of the cross domain file is 1024 or above, cross domain relevance identifier 246 determines whether the socket request port number is below 1024. If so, cross domain relevance identifier 246 does not mark the cross domain domain and port as relevant, and if the port number of the socket request is above 1024, cross domain relevance identifier 246 marks the cross domain domain and port as relevant. This ensures that a cross domain file specified as being available from port 1024 or above cannot grant permission for a socket on a port below 1024.

When cross domain relevance identifier 246 has read each cross domain file domain provided on the list and marked the relevant cross domain domains, cross domain relevance identifier 246 returns the marked list to access manager 240. If cross domain relevance identifier 246 does not find a match between any domain provided on the list of cross domain file domains and ports with the domain of the requested socket, cross domain relevance identifier 246 returns an indication to access manager 240 that no provided cross domain file domain is relevant. When access manager 240 receives such an indication, access manager 240 proceeds as described further below.

If access manager 240 receives the marked list from cross domain relevance identifier 246, access manager 240 selects the first cross domain file on the list marked as relevant by cross domain relevance identifier 246 as described above. Access manager 240 then provides the selected cross domain file domain and port number from the marked list to cross domain file retriever 242.

When cross domain file retriever 242 receives the cross domain file domain and port number from access manager 240, cross domain file retriever 242 requests the cross domain file from the source of the cross domain file. To do so, cross domain file retriever 242 opens a socket connection using the port number specified by the cross domain file domain and port number it receives. In one embodiment, the opening of such socket connection implicitly generates a request for a cross domain file, and in another embodiment, cross domain file retriever 242 provides an explicit request over the socket to the source of the cross domain file to distinguish the policy file request from other communications sent to that same domain and port, which may, in fact, be the same domain and port for which access is being determined. In one embodiment, this request may be a line of text consisting of the characters, "<policy-file-request/>ϕ" where "ϕ" is the null character, sometimes specified as \0. If the source of the cross domain file understands the request, it responds to the request by sending the cross domain file through the socket connection to cross domain file retriever 242. If the source of the cross domain file does not understand the request, it does not send the cross domain file to cross domain file retriever 242.

In one embodiment, cross domain file retriever 242 maintains an internal timer of the length of time of the response of the source of the cross domain file. If cross domain file retriever 242 does not receive a response from the source of the cross domain file within a specific time period, cross domain file retriever 242 discontinues the attempt to retrieve the cross domain file and returns a message indicating that the cross domain file was not retrieved as described below. In one embodiment, the specific time period is 2 seconds. In one embodiment, the specific time period is 20 seconds. The specific time period may be specified by the user, the operating system, the program, any component of system 200 or any combination of the above.

If cross domain file retriever 242 does not receive a cross domain file from the domain and port received from access manager 240, cross domain file retriever 242 returns a message to access manager 240 indicating that no cross domain file was retrieved from the socket connection request. When access manager 240 receives such an indication, access manager 240 provides the domain and port of the next relevant entry on the list to cross domain file retriever 242 and repeats this process until it receives an indication that a cross domain file was received or there are no more entries in the list.

In one embodiment, if there are no more cross domain domains and ports in the list, access manager 240 signals socket request manager 252, which signals program executor 224, each signal indicating that a cross domain file was not received. Program executor 224 signals the program, which either continues executing or terminates as described herein. In another embodiment described in more detail below, if there are no more cross domain domains and ports on the list, access manager 240 obtains a default cross domain domain and port and causes an additional attempt to retrieve a cross domain file from that domain and port before signaling socket request manager 252 that the cross domain file was not received.

If cross domain file retriever 242 receives the requested cross domain file from the source of the cross domain file, cross domain file retriever 242 stores the cross domain file in file storage 234 associated with the program requesting the file, via the operating system, and receives a handle to the file from the operating system. Cross domain file retriever 242 provides the handle to access manager 240, which proceeds as will now be described. In one embodiment, the policy file is encoded as conventional ASCII text, or encoded using another conventional encoding.

Upon receipt of the cross domain file, the server sending the file may terminate the socket connection, and if it does not do so within a period of time, cross domain file retriever 242 terminates the socket connection.

Determining if Port Permission is Granted

When access manager 240 receives the handle to the retrieved cross domain file from cross domain file retriever 242, access manager 240 provides a permission request to port permission identifier 250 which may include the handle of the retrieved file and the port number of the requested socket connection. When port permission identifier 250 receives the permission request, port permission identifier 250 determines whether port permission is granted by the retrieved cross domain file stored in file storage 234. To do so, port permission identifier 250 parses the retrieved cross domain file such that each allow-access-from tag is separated out from the body of the cross-domain-policy root element using conventional methods.

Once port permission identifier 250 isolates an allow-access-from tag, port permission identifier 250 parses the tag to determine whether the domain in the tag matches the domain of the program in the same manner as described above. In one embodiment, if the domain does not match, port permission identifier 250 selects the next tag and repeats the process described above until no more allow-access-from tags exist in the file, in which case port permission identifier 250 so indicates to access manager 240, or an allow-access-from tag with a matching domain is located by port permission identifier 250.

In one embodiment, other than in a default cross domain file, each "allow-access-from" tag in a cross domain file granting access to socket requests contains a "to-ports" attribute that specifies the one or more ports to which the domain for which permission has been granted may access, and the value or values of the to-ports attribute in the tag having a matching domain will correspond to the port of the socket connection request in order for such a socket request to be granted access. For an allow-access-from tag having a matching domain, port permission identifier 250 parses the tag for the "to-ports" attribute by reading from left to right the characters within the tag, and specifically looking for the string of characters, "to-ports=". The set of characters immediately following such a string of characters or a quotes character following such a string and leading up to the close quotes """ or end tag "/" character denote the allowable one or more port numbers and are further parsed using conventional methods such that any string of numbers separated by a ";" (comma) character is determined to be two separate port numbers and a "-" (dash) between a string of numbers denotes a range of acceptable port numbers. E.g. to-ports="37, 41, 56-60" grants access to the domain in the tag for socket requests made to the domain from which the cross domain file was retrieved for socket requests made to any of ports 37, 41, 56, 57, 58, 59 or 60.

When port permission identifier 250 determines which set of port numbers is permitted by the parsed tag as described above, port permission identifier 250 compares that set of port numbers with the port number of the requested socket connection provided by access manager 240 using conventional methods. If the port number of the requested socket connection matches a port number specified by the parsed tag, or the requested socket connection port number falls within a range of port numbers specified by the parsed tag, port permission identifier 250 determines that permission is granted and signals access manager 240 with such an indication. Access manager 240 receives the indication that permission is granted from port permission identifier 250 and proceeds as described further below.

As noted above, if the port number of the requested socket connection does not match any port number or fall within a range of port numbers specified by the parsed tag, port permission identifier 250 checks the next allow-access-from tag isolated from the retrieved cross domain file as described above and repeats the process described above until it obtains a tag that grants access to the socket request or there are no more tags in the file.

If port permission identifier 250 checks each allow-access-from tag in the retrieved cross domain file and no parsed tag specifies a matching domain and matching port number or a range of port numbers in which the requested socket connection port number falls, port permission identifier 250 signals access manager 240 with such an indication.

When access manager 240 receives such an indication, access manager 240 checks the marked list provided by cross domain relevance identifier 246 as described above for another relevant cross domain file domain on the list. If another cross domain file domain is marked as relevant, access manager 240 repeats the process as described above using that cross domain file domain to retrieve the relevant cross domain file and provide the handle of the retrieved file to port permission identifier 250. When port permission identifier 250 receives the cross domain file, port permission identifier 250 repeats the process as described above to determine if an allow-access-from tag in the retrieved cross domain file specifies a matching port number or range of port numbers to the requested socket port number. The process may be repeated for all relevant cross domain file domains on the list, until permission is granted as described above or no more relevant cross domain file domains exist on the list.

If permission is not granted and access manager 240 does not find another cross domain file domain marked as relevant on the list returned by cross domain relevance identifier 246, access manager 240 provides default cross domain file identifier 248 with a request for a default cross domain list which may include the domain and port of the socket request. Default cross domain file identifier 248 receives the request from access manager 240 and proceeds to generate a default cross domain file domain and port list that, in one embodiment, is similar in form to the cross domain file domain and port number list described above. Default cross domain file identifier 248, in one embodiment, retrieves at least one cross domain file domain and port number and builds a list of at least one cross domain file domain and port number where each cross domain file domain is the same as the domain provided of the socket request. In one embodiment, only a single entry on the list is generated by default cross domain file identifier 248, with a port number of "80". Default cross domain file identifier 248 then marks the entries on the list as relevant (or marks those as relevant in the manner described above regarding ports above and below 1024) and provides the assembled list to access manager 240.

When access manager 240 receives the default cross domain file domain list from default cross domain file identifier 248, access manager 240 selects a default cross domain file domain and port number and provides the selected cross domain file domain and port number to cross domain file retriever 242 which proceeds as described above.

In one embodiment, the protocol, that corresponds to the port used for the default cross domain file, on the list of well known ports maintained at the web site of iana.org/assignments/port-numbers (or another list), is used in place of a socket connection to retrieve a default cross domain file. For example, if a port number of 80 is used, HTTP is used by cross domain file retriever 242 to retrieve the cross domain file. Access manager 240 notifies cross domain file retriever 242 that the request is for a default cross domain file so that cross domain file retriever 242 can perform this function. The retrieval of other cross domain files may also employ this technique in other embodiments.

If cross domain file retriever 242 receives the cross domain file from the source domain, cross domain file retriever 242 stores the cross domain file in file storage 234 via the operating system as described above and provides the handle to the cross domain file to access manager 240. Access manager 240 provides the handle, the port number of the socket request, the source record of the program file, and an indication that the cross domain file is a default cross domain file to port permission identifier 250. Port permission identifier 250 determines if the retrieved default cross domain file contains a tag with a matching domain and a port number or range of port numbers that matches the port number of the socket request as described above. In one embodiment, each "allow-access-from" tag in a default cross domain file is treated by port permission identifier as if it had a to-ports attribute value that includes 1024-65535, whether it specifies a to-ports attribute value or not.

If port permission identifier 250 determines that port permission is granted, port permission identifier 250 signals access manager 240 with such an indication which then proceeds as described further below. If port permission identifier 250 does not find an allow-access-from tag that specifies a matching domain and a port number corresponding to the port number of the socket request as described above, port permission identifier 250 signals access manager 240 with such an indication, which then proceeds as described below.

If access manager 240 receives an indication from port permission identifier 250 that the provided default cross domain file did not grant access for the socket request, access manager 240 then checks for another relevant default cross domain file domain and port number on the list provided by default cross domain file identifier 248 as described above. If access manager 240 finds another relevant default cross domain file domain and port number, access manager 240 provides the domain and port number to cross domain file retriever 242 which proceeds as described above, and this process is repeated as described herein until access is granted or there are no further default cross domain files in the list.

If access manager 240 receives an indication from port permission identifier 250 that permission is granted, access manager 240 signals socket request manager 252 with such an indication. Socket request manager 252 receives the indication and provides program executor 224 with permission to complete the socket connection request which may include the domain and port number of the requested socket connection.

If program executor 224 receives the indication that permission for the socket request was granted via a cross domain file as described above, program executor 224 opens the requested socket. If access manager 240 does not locate a cross domain file or default cross domain file that grants access to the domain, access manager 240 signals socket request manager 252, which so indicate to program executor 224 when it receives such an indicating. Program executor 224 does not open the requested socket, and returns an error message, such as a message indicating that the program does not have permission to open the requested socket.

Other Forms of Cross Domain Files.

In one embodiment, a tag in a cross domain file may employ an attribute override the default that it grants permission to files, socket services or other services in the directory of the cross domain file and all subdirectories thereof. Each "allow-access-from" tag may specify as the value of a "to-directories" attribute that lists one or more subdirectories to which permission is granted by the tag.

In such embodiment, access manager 240 also provides the source record of the requested file to domain permission identifier 244 and domain permission identifier attempts to locate a tag that grants access to the domain from which the program was downloaded. If a "to-directories" attribute is specified by that tag, domain permission identifier 244 determines if the path of the requested file matches one of the directories specified in the to-directories attribute in one embodiment, or in another embodiment either matches, or descends from, one of the directories specified in the to-directories attribute, domain permission identifier 244 returns to access manager 240 the indication that permission is granted and the handle to the cross domain file. Otherwise, domain permission identifier 244 continues searching the tags for one that grants access as described above.

In still another embodiment, cross domain files in a descendant directory of a directory from which a cross domain file granting access to a service (such as a file request) was retrieved can revoke permission to access a file or other service. When domain permission identifier 244 returns to access manager 240 the indication that permission is granted and the handle to the cross domain file, access manager 240 causes the searching for such cross domain files in such subdirectories in the path to the requested file, from the directory in which the cross domain file granting access was located, to the directory in which the requested file is located and causes the investigation as to whether any such cross domain file located denies access to the service, such as scanning the tags in the file and matching the domain name of the program requesting the service with the domain names in any tags (e.g. "deny-access-from") that deny access. If so, access to the file, socket service or other service that would have been granted as described above is denied, or is granted in a limited fashion as described above.

Any such cross domain file may be part of a cross domain file that grants access as described above, or a separate file that denies access. The name of the file may be the same name as the cross domain file that granted access, or a name of the default or an alternate default filename to allow it to be searched in the subdirectory or subdirectories described above. In still another embodiment, the name of the cross domain file, or the path or paths and name of any such cross domain file, to be searched is specified as an attribute of the tag in the cross domain file that granted access to the service.

Other Ways of Obtaining Cross Domain Files.

As described herein, a cross domain file can be specified at a time before the service for which the cross domain file may grant access is requested. In one embodiment, any cross domain file may be retrieved at the time it is specified, to be used as described above when the service is requested for which the cross domain file retrieved previously may grant access.

If program executor 224 can operate asynchronously, processing commands or instructions out of the order specified in the program file, in such embodiment, program executor 224 may wait for all prior-specified cross domain files or relevant prior specified cross domain files to be obtained as described above before attempting to retrieve a requested file or performing another requested service that utilizes the cross domain files, such as a socket connection request or other socket service.

Figures 3, 3B:
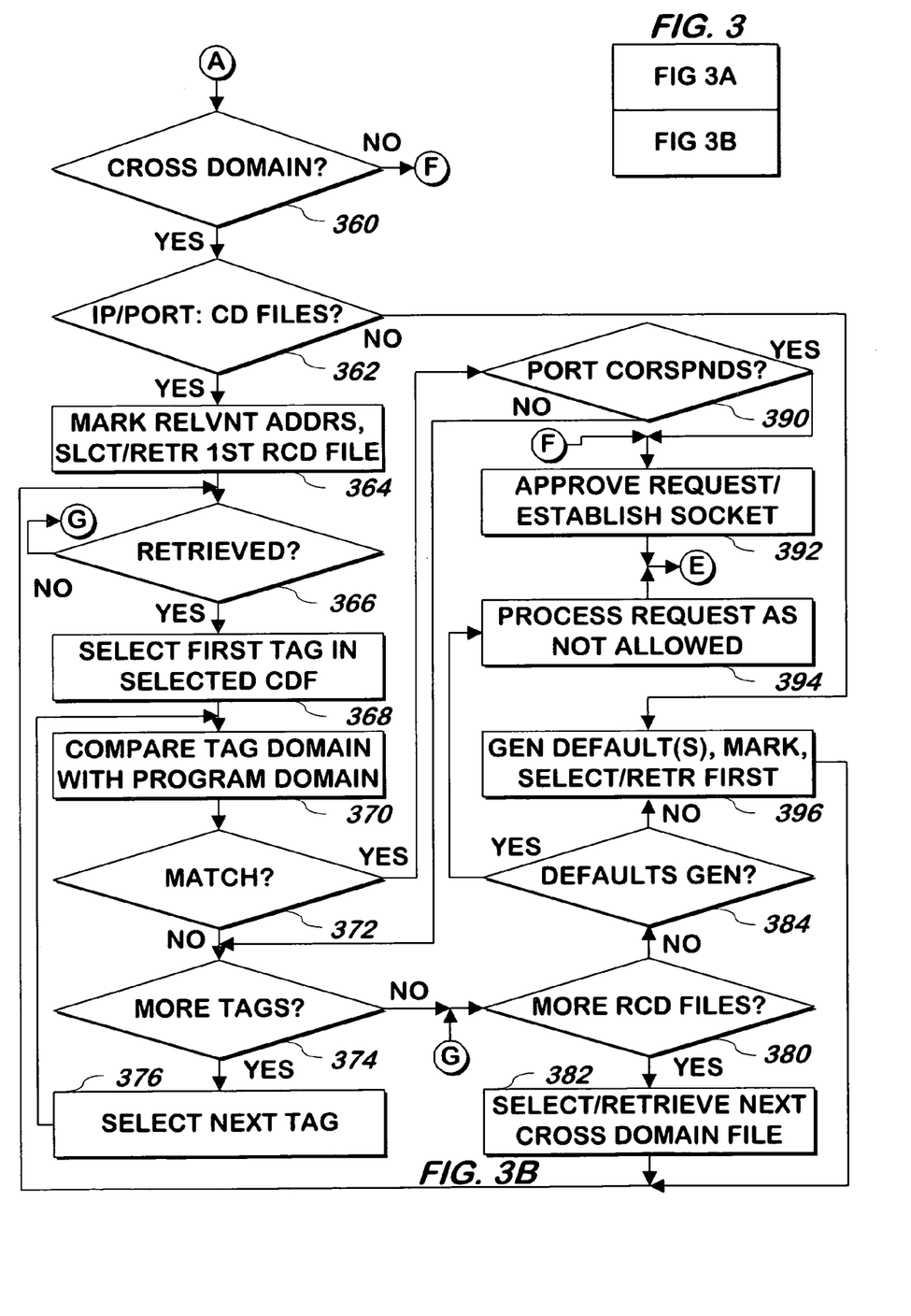
Figure 3A:
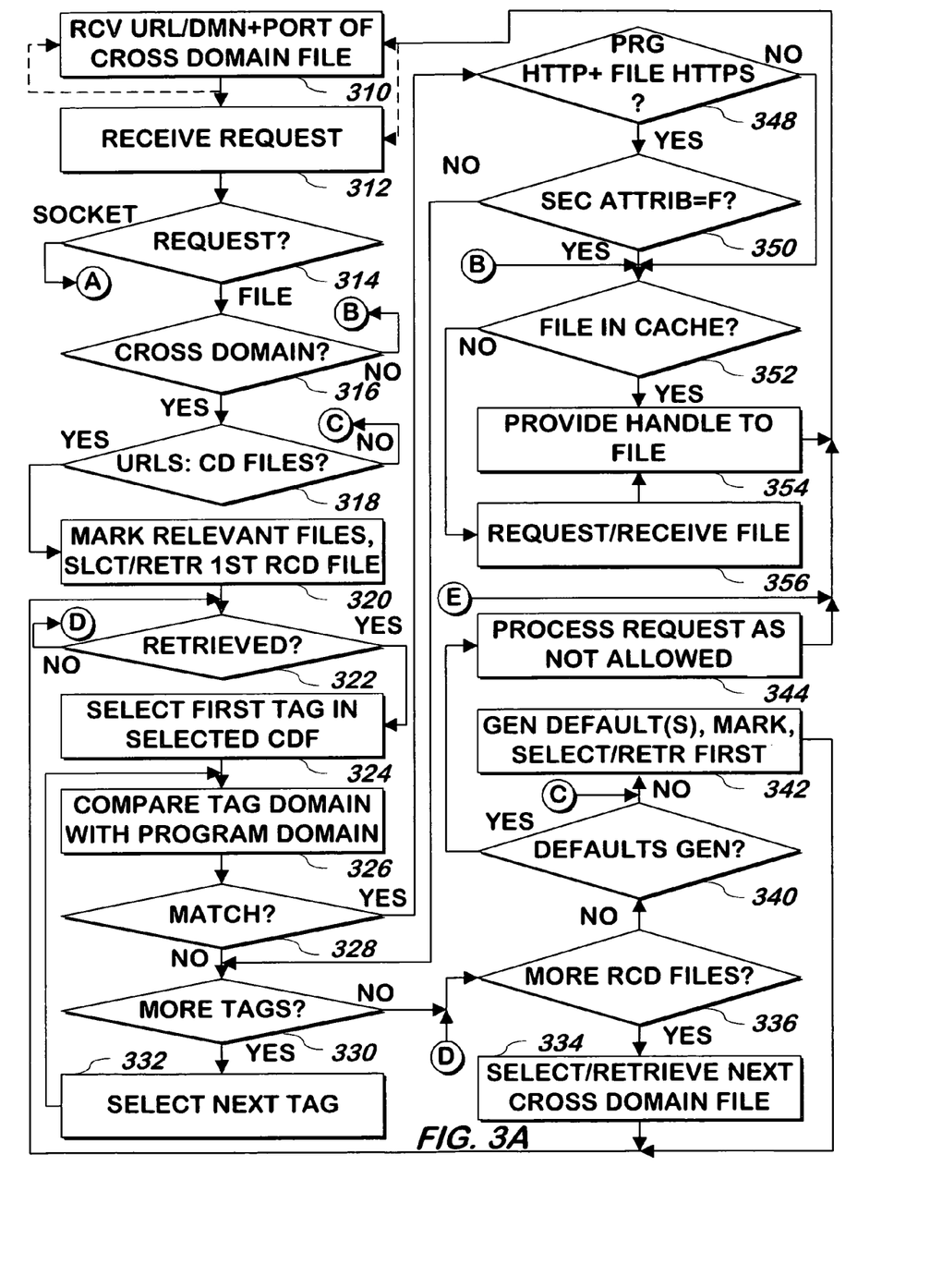

Referring now to FIG. 3, consisting of FIGS. 3A and 3B, a method of providing access to services is shown according to one embodiment of the present invention. One or more URLs or domains and ports identifying one or more cross domain files may be received 310. Step 310 may be repeated as many times as desired as indicated by the dashed line in the Figure. A request is received from a program or other entity downloaded from a domain 312 and if the request is a request for a file 314, if the request is made for a file on a domain different from the domain from which the file containing the instruction making the request was downloaded 316, then the request is a cross domain file request and the method continues at step 318. If the request is for a file 314, but from the same domain as the file containing the instruction that generated the request 316, the method continues at step 352.

At step 318, if the URLs of one or more cross domain files were received in steps 310 or 312, the method continues at step 320 and otherwise 318, the method continues at step 342.

The URLs of the cross domain files may be marked as relevant as described above and the first relevant cross domain file may be selected 320 and an attempt may be made to retrieve the cross domain file. If the file is retrieved 322 from the selected URL, the method continues at step 324 and otherwise 322, the method continues at step 336.

At step 324, the first allow-access-from tag is selected in the selected file and the domain from which the program or other entity was downloaded requesting the file is compared with the domain in the tag 326. If the domains match 328, the method continues at step 348. If the domains do not match 328, if there are more tags in the selected file 330, the next tag in the selected file is selected 332 and the method continues at step 326 using that tag. If there are no more tags in the selected cross domain file 330, if there are more relevant cross domain file URLs 336, the next cross domain file URL is selected and an attempt is made to retrieve the cross domain file from that URL 334 and the method continues at step 322 using the selected cross domain file.

At step 336, if there are no more relevant cross domain files, if one or more default cross domain file URLs have been generated and processed as described herein for the request 340, the request is processed as not allowed 344, and the method continues at steps 310 or 312. Step 344 may include retrieving the requested file anyway and providing it for restricted uses as described above, or not retrieving the requested file and providing the program requesting it with an error message. If no default cross domain file URLs have been generated 340, one or more default cross domain file URLs are generated, marked as relevant as described above and the first one is selected and an attempt is made to retrieve the file indicated by the selected URL 342 and the method continues at step 322 using the selected file. Subsequent performances of steps 322, 324, 336 and 338 use the default cross domain files.

At step 348, if the protocol used to retrieve the program file was HTTP and the requested file protocol is retrieved using HTTPS, if the secure attribute in the selected tag is false 350, if the file is in the cache 352, a handle to the file is provided to the requesting program 354 and the method continues at step 310 or 312. If the file is not in the cache 352, the file is requested and received 356 and the method continues at step 354. If the program protocol was not HTTP or the requested file is not HTTPS 348, the method continues at step 352.

If, at step 350, the secure attribute does not have a value of false, the method continues at step 330.

At step 314, if the request is a socket request, the method continues at step 360 of FIG. 3B. At step 360 of FIG. 3B, if the domain corresponding to the socket is different from the domain from which the program requesting the socket was downloaded, the method continues at step 362 and otherwise 360, the method continues at step 392.

At step 362, if there was one or more domains and ports for cross domain files specified in steps 310 or 312, the method continues at step 364 and otherwise 362, the method continues at step 396. At step 364, the relevant domains and ports are marked as described above and the first one is selected and an attempt is made to retrieve a cross domain file corresponding to the selected domain and port. If the cross domain file is not retrieved from the selected domain and port 366, the method continues at step 380. If the cross domain file is retrieved from the selected domain and port 366, the first allow-access-from tag is selected from the selected file and the domain in the tag is compared with the domain from which the program or other entity requesting the socket was downloaded 370. If these domains match 372, the method continues at step 390 and otherwise 372, if there are more allow-access-from tags in the selected file 374, the next tag is selected 376 and the method continues at step 370. If there are no more allow-access-from tags in the selected file 374, if there are additional relevant domains and ports of cross domain files 380, the next one is selected and an attempt is made to retrieve a cross domain file from that domain and port as described above 382 and the method continues at step 366.

If there are no additional relevant cross domain files 384 if one or more default domains and ports of cross domain files have already been generated for this request 384, the method continues at step 394 and otherwise 384, one or more default domains and ports of cross domain files are generated, the first one is selected and an attempt is made to retrieve the selected default cross domain file 396 and the method continues at step 366 using the selected default cross domain file and steps 366, 368, 380 and 382 are applied to the default cross domain file domains and ports. If at step 384 default cross domain file domains and ports have already been generated for the socket connection request, the request is denied 394 or otherwise processed differently than it is processed in step 392 and the method continues at steps 310 or 312 of FIG. 3A.

At step 390, if the port of the socket request corresponds to the port in the tag (either because it is listed in the tag as a "to-ports" attribute or is in a range in the to-ports attribute or the tag is from a default cross domain file and the port in the socket request is above 1024 as described above), the socket request is approved and the socket connection is established 392 and the method continues at steps 310 or 312 of FIG. 3A.

What is claimed is:

1. A method of providing a program access to a service, the method performed by a computer system, the method comprising:
   receiving a request for the service from the program downloaded from a first domain;
   identifying whether the service requested corresponds to a second domain different from the first domain;
   responsive to identifying that the service requested corresponds to the second domain, reading one or more cross-domain files supplied by the second domain, each of the one or more cross-domain files specifies at least one domain that is not the same as a domain on which the corresponding cross-domain file resides, and a location is identified for at least one of the one or more cross-domain files, the identified location not being received from the program;
   responsive to reading the one or more cross-domain files, determining whether at least one of the one or more cross-domain files indicates that access to the service is granted; and
      responsive to determining that at least one of the one or more cross-domain files indicates that access to the service is granted, providing access to the requested service by the program.

2. The method of claim 1, additionally comprising, responsive to determining that each of the one or more cross-domain files indicates that access to the service is not granted, denying access to the service by the program.

3. The method of claim 1, wherein a location of at least one of the one or more cross-domain files is received from the program.

4. The method of claim 1 wherein the service comprises a file.

5. The method of claim 4, additionally comprising, for each of the one or more cross-domain files:
   comparing a first path containing the requested file with a path of said cross-domain file; and
   determining whether said cross domain file is relevant.

6. The method of claim 5 wherein determining whether said cross-domain file is relevant comprises identifying whether:
   the path of said cross-domain file contains the requested file; or
   the requested file descends from the path of said cross-domain file.

7. The method of claim 4, wherein providing access to the service additionally comprises determining a protocol over which the file is requested and determining a protocol corresponding to the program.

8. The method of claim 7, wherein the protocol corresponding to the program comprises a protocol used to download the program.

9. The method of claim 8, wherein providing access to the service further comprises:
   determining that the requested file has a protocol of HTTPS and the protocol used to download the program is HTTP; and
   identifying an attribute in the at least one cross-domain file indicating that access to the service is granted.

10. The method of claim 1, wherein the service comprises a communication channel.

11. The method of claim 1, wherein providing access to the requested service by the program further comprises identifying a port number, for which access is granted, of the communication channel.

12. The method of claim 11, wherein providing access to the requested service by the program additionally comprises determining whether the at least one of the one or more cross-domain files indicating that access to the service is granted was specified by the program.

13. A computer program product comprising a computer useable storage device having computer readable program code embodied therein for providing a program access to a service, the computer program product comprising computer readable program code devices configured to cause a computer system to:
   receive a request for the service from the program downloaded from a first domain;
   identify whether the service requested corresponds to a second domain different from the first domain;
   responsive to identifying that the service requested corresponds to the second domain, read one or more cross-domain files supplied by the second domain, each of the one or more cross-domain files specifies at least one domain that is not the same as a domain on which the corresponding cross-domain file resides, and a location is identified for at least one of the one or more cross-domain files, the identified location not being received from the program;
   responsive to reading the one or more cross-domain files, determine whether at least one of the one or more cross-domain files indicates that access to the service is granted; and responsive to determining that at least one of the one or more cross-domain files indicates that access to the service is granted, provide access to the requested service by the program.

14. The computer program product of claim 13, additionally comprising computer readable program code devices configured to cause the computer system to, responsive to determining that each of the one or more cross-domain files indicates that access to the service is not granted, deny access to the service by the program.

15. The computer program product of claim 13, wherein a location of at least one of the one or more cross-domain files is received from the program.

16. The computer program product of claim 13:
wherein a location of at least one of the one or more cross-domain files is not received from the program; and
additionally comprising computer readable program code devices configured to cause the computer system to identify a location of each of the one or more cross-domain files not received from the program.

17. The computer program product of claim 13 wherein the service comprises a file.

18. The computer program product of claim 17, additionally comprising computer readable program code devices configured to cause the computer system to, for each of the one or more cross-domain files:
compare a first path containing the requested file with a path of said cross-domain file; and
determine whether said cross-domain file is relevant.

19. The computer program product of claim 18 wherein the computer readable program code devices configured to cause the computer system to determine whether said cross-domain file is relevant comprise computer readable program code devices configured to cause the computer system to identify whether:
the path of said cross-domain file contains the requested file; or
the requested file descends from the path of said cross-domain file.

20. The computer program product of claim 17, wherein the computer readable program code devices configured to cause the computer system to provide access to the service additionally comprises computer readable program code devices configured to cause the computer system to determine a protocol over which the file is requested and determine a protocol corresponding to the program.

21. The computer program product of claim 20, wherein the protocol corresponding to the program comprises a protocol used to download the program.

22. The computer program product of claim 21, wherein the computer readable program code devices configured to cause the computer system to provide access to the service additionally comprises computer readable program code devices configured to cause the computer system to determine that the requested file has a protocol of HTTPS and the protocol used to download the program is HTTP, and identify an attribute in the at least one cross-domain file indicating that access to the service is granted.

23. The computer program product of claim 13, wherein the service comprises a communication channel.

24. The computer program product of claim 13, wherein the computer readable program code devices configured to cause the computer system to provide access to the requested service by the program additionally comprises computer readable program code devices configured to cause the computer system to identify a port number, for which access is granted, of the communication channel.

25. The computer program product of claim 24, wherein the computer readable program code devices configured to cause the computer system to provide access to the requested service by the program additionally comprises computer readable program code devices configured to cause the computer system to determine whether the at least one of the one or more cross-domain files indicating that access to the serve is granted was specified by the program.

26. A system comprising:
an output device;
a machine-readable storage device including a program product for providing a program access to a service; and
one or more processors operable to execute the program product, interact with the output device, and perform operations comprising:
receiving a request for the service from the program downloaded from a first domain;
identifying whether the service requested corresponds to a second domain different from the first domain;
responsive to identifying that the service requested corresponds to a second domain, reading one or more cross-domain files supplied by the second domain, each of the one or more cross-domain files specifies at least one domain that is not the same as a domain on which the corresponding cross-domain file resides, and a location is identified for at least one of the one or more cross-domain files, the identified location not being received from the program;
responsive to reading the one or more cross-domain files, determining whether at least one of the one or more cross-domain files indicates that access to the service is granted; and
responsive to determining that at least one of the one or more cross-domain files indicates that access to the service is granted, providing access to the requested service by the program.

27. The system according to claim 26, wherein the one or more processors are operable to perform operations further comprising, responsive to determining that each of the one or more cross-domain files indicates that access to the service is not granted, denying access to the service by the program.

28. The system according to claim 26, wherein a location of each of at least one of the one or more cross-domain files is received from the program.

29. The system according to claim 26, wherein a location of at least one of the one or more cross-domain files is not received from the program, and
wherein the one or more processors are operable to perform operations further comprising identifying a location of each of the one or more cross-domain files not received from the program.

30. The system of claim 26, wherein the service comprises a file.

31. The system of claim 30, wherein the one or more processors are operable to perform operations further comprising, for each of the one or more cross-domain files:
comparing a first path containing the requested file with a path of said cross-domain file; and
determining whether said cross-domain file is relevant.

32. The system of claim 31, wherein determining whether said cross-domain file is relevant comprises identifying whether:
the path of said cross-domain file contains the requested file; or
the requested file descends from the path of said cross-domain file.

33. The system of claim 30, wherein providing access to the service additionally comprises determining a protocol over which the file is requested and determining a protocol corresponding to the program.

34. The system of claim 33, wherein the protocol corresponding to the program comprises a protocol used to download the program.

35. The system of claim 34, wherein providing access to the service further comprises:
   determining that the requested file has a protocol of HTTPS and the protocol used to download the program is HTTP; and
   identifying an attribute in the at least one cross-domain file indicating that access to the service is granted.

36. The system of claim 26, wherein the service comprises a communication channel.

37. The system of claim 26, wherein providing access to the requested service by the program further comprises identifying a port number, for which access is granted, of the communication channel.

38. The system of claim 37, wherein providing access to the requested service by the program additionally comprises determining whether the at least one of the one or more cross-domain files indicating that access to the service is granted was specified by the program.

* * * * *